US008441679B2

(12) United States Patent
Tsuzuki

(10) Patent No.: US 8,441,679 B2
(45) Date of Patent: May 14, 2013

(54) IMAGE FORMING DEVICE CAPABLE OF COMPLETING ACCESS OPERATION TO RFID ON RECORDING MEDIUM

(75) Inventor: Toru Tsuzuki, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 789 days.

(21) Appl. No.: 12/573,426

(22) Filed: Oct. 5, 2009

(65) Prior Publication Data

US 2010/0103451 A1 Apr. 29, 2010

(30) Foreign Application Priority Data

Oct. 28, 2008 (JP) ................................ 2008-277128

(51) Int. Cl.
*H04N 1/00* (2006.01)
*G03G 15/00* (2006.01)

(52) U.S. Cl.
USPC ........... 358/1.6; 358/1.9; 358/1.12; 358/1.18; 347/16; 235/375; 235/475; 235/437; 235/435; 399/397; 399/401; 399/402; 399/389; 399/364

(58) Field of Classification Search .................. 399/389, 399/390, 18, 23, 16, 13, 45, 43, 215, 234, 399/297, 303, 364, 365–375, 401, 402, 405, 399/396, 397; 101/484, 35, 36, 41, 42, 43; 347/16; 358/1.6, 1.9, 1.18, 1.13, 1.12, 504, 501; 235/437, 235/449, 454, 462.01, 462.18, 435
See application file for complete search history.

(56) References Cited

U.S. PATENT DOCUMENTS 5,229,586 A * 7/1993 Ishii .............................. 235/375
6,409,401 B1 * 6/2002 Petteruti et al. ................. 400/88
(Continued)

FOREIGN PATENT DOCUMENTS

JP 2000-285203 10/2000
JP 2003-150914 5/2003
(Continued)

OTHER PUBLICATIONS

Japanese Office Action dated Jun. 3, 2010 with English translation.

*Primary Examiner* — Dennis Dicker
(74) *Attorney, Agent, or Firm* — Scully, Scott, Murphy & Presser, PC

(57) ABSTRACT

There is provided an image forming device that includes a conveyor section, an image forming section, an accessing section and a control unit. The conveyor section conveys recording media in a conveying path, the recording media including a recording medium having a data storage unit attached thereto and a recording medium with no data storage unit attached thereto, the data storage unit storing data or being capable of storing data. The image forming section forms an image on the recording medium. The accessing section is disposed at an access position along the conveying path and accesses the data storage unit to execute an access operation to write data into or read data from the data storage unit. The control section is configured to control the conveyor section and the accessing section to bring the recording medium having passed the access position back to the access position and to access the data storage unit attached to the recording medium which has brought back to the access position to execute a re-access operation to write unprocessed data into or read unprocessed data from the data storage unit, the unprocessed data being such data that remained unprocessed with the access operation.

10 Claims, 6 Drawing Sheets

U.S. PATENT DOCUMENTS

| | | | | |
|---|---|---|---|---|
| 7,454,528 | B2 * | 11/2008 | Kanoshima et al. | 710/2 |
| 2005/0029353 | A1 * | 2/2005 | Isemura et al. | 235/454 |
| 2006/0038844 | A1 * | 2/2006 | Kiwada et al. | 347/16 |
| 2007/0230986 | A1 * | 10/2007 | Miyata | 399/84 |
| 2007/0237087 | A1 | 10/2007 | Shimizu | |
| 2007/0274753 | A1 | 11/2007 | Muto | |
| 2008/0025740 | A1 | 1/2008 | Kadota | |

FOREIGN PATENT DOCUMENTS

| | | |
|---|---|---|
| JP | 2006-88478 | 4/2006 |
| JP | 2006-110802 | 4/2006 |
| JP | 2007-280197 | 10/2007 |
| JP | 2008-33146 | 2/2008 |
| JP | 2008-137784 | 6/2008 |

* cited by examiner

IMAGE FORMING DEVICE CAPABLE OF COMPLETING ACCESS OPERATION TO RFID ON RECORDING MEDIUM

CROSS REFERENCE TO RELATED APPLICATION

This application claims priority from Japanese Patent Application No. 2008-277128 filed Oct. 28, 2008. The entire content of the priority application is incorporated herein by reference.

TECHNICAL FIELD

The present invention relates to an image forming device, and more particularly to an image forming device capable of writing or reading data stored in a storage unit attached to a recording medium, such as an RFID (Radio Frequency IDentification).

BACKGROUND

There has been provided an image forming device that can write or read data stored in an IC chip (storage unit) called RFID attached to a recording medium when forming images on the recording medium. Such a conventional image forming device is able to re-convey the recording medium for re-accessing the IC chip even if a try to access the IC chip has once failed. However, even though the recording medium is brought back to re-access the data in the IC chip, if the IC chip stores too much information to be accessed at a time, such a re-try tends to result in another failure.

SUMMARY

In view of the foregoing, it is an object of the present invention to provide an image forming device capable of enhancing a probability that the image forming device can successfully complete an access to data in a storage unit attached to a recording medium.

In order to attain the above and other objects, there is provided an image forming device that includes a conveyor section, an image forming section, an accessing section and a control unit. The conveyor section conveys recording media in a conveying path, the recording media including a recording medium having a data storage unit attached thereto and a recording medium with no data storage unit attached thereto, the data storage unit storing data or being capable of storing data. The image forming section forms an image on the recording medium. The accessing section is disposed at an access position along the conveying path and accesses the data storage unit to execute an access operation to write data into or read data from the data storage unit. The control section is configured to control the conveyor section and the accessing section to bring the recording medium having passed the access position back to the access position and to access the data storage unit attached to the recording medium which has brought back to the access position to execute a re-access operation to write unprocessed data into or read unprocessed data from the data storage unit, the unprocessed data being such data that remained unprocessed with the access operation.

DETAILED DESCRIPTION

First, a printer 1 according to a first embodiment of the present invention will be described with reference to FIGS. 1 to 4.

Figure 1:
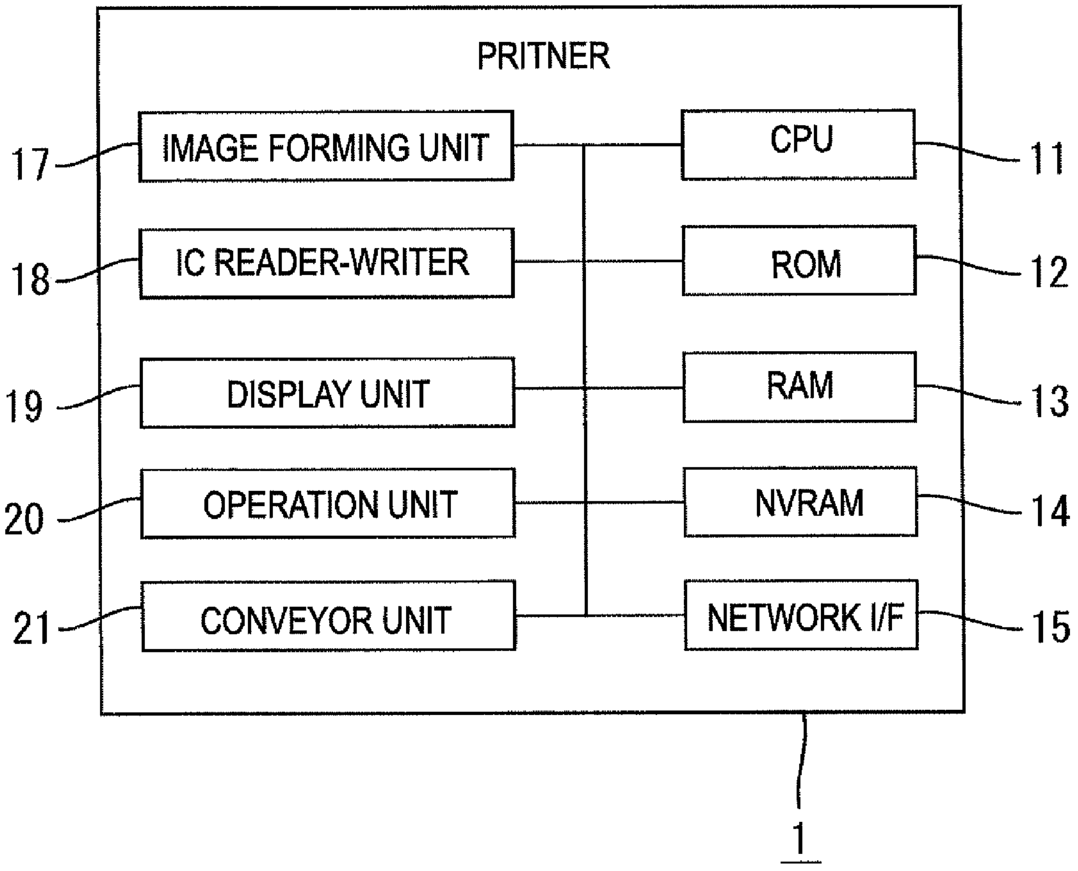
FIG. 1 is a block diagram briefly showing an electric configuration of a printer as an example of an image forming device according to a first embodiment of the present invention.

As shown in FIG. 1, the printer 1 includes a CPU 11, a ROM 12, a RAM 13, an NVRAM 14, a network interface 15, an image forming unit 17, an IC reader-writer 18, a display unit 19, an operation unit 20 and a conveyor unit 21.

The ROM 12 stores programs necessary for executing various operations including a print routine (to be described later). The CPU 11 controls each unit of the printer 1 in accordance with programs read from the ROM 12, while instructing the RAM 13 or the NVRAM 14 to store necessary processing results or data. The network interface 15 is connected to an external computer (not shown) via a network so that the printer 1 can communicate with the external computer.

The image forming unit 17 forms images on sheets 25 (shown in FIG. 2) using one or a plurality of colorants (ink or toner). The IC reader-writer 18 communicates with an RFID tag incorporated into the sheet 25, using radio waves, without contact. The IC reader-writer 18 is so configured as to be able to either read data stored in the RFID tag or write data into the RFID tag. Alternatively, the IC reader-writer 18 may be so configured as to be able to both read and write data. Such reading and writing operations performed by the IC reader-writer 18 are to be called as an 'access operation' hereinafter.

The display unit 19 is provided with a lamp and a display on which various set-up screens and operating states of each unit are configured to be displayed. The operation unit 20 includes a plurality of buttons with which a user can input various commands.

Figure 2:
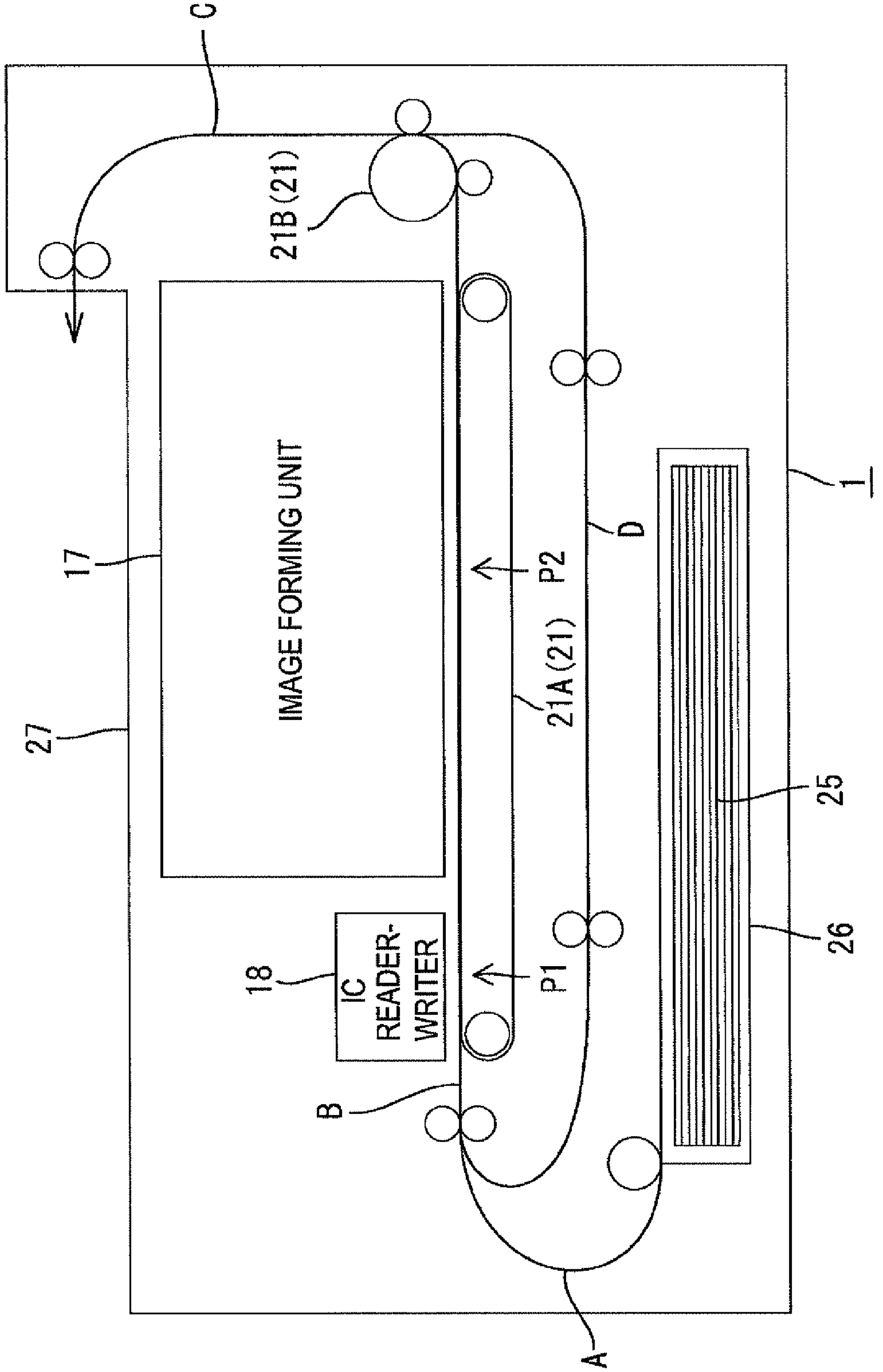
FIG. 2 is a cross-sectional view illustrating a general configuration of the printer according to the first embodiment.

As shown in FIG. 2, the conveyor unit 21 includes a plurality of rollers, a belt unit 21A for conveying the sheets 25, and a switchback mechanism 21B (to be described later). Although not shown in FIG. 2, the belt unit 21A is also provided with a motor as a driving source and a gear mechanism that transmits driving force of the motor to the rollers.

As also shown in FIG. 2, the printer 1 includes a sheet accommodation tray 26 in which a plurality of sheets 25 are stacked, and a discharge tray 27 formed on an upper surface of the printer 1. Note that the sheets 25 may or may not be provided with RFID tags. The conveyor unit 21 conveys an uppermost sheet of the stack of the sheets 25 at a time to a sheet conveying path A, then to a sheet conveying path B, and subsequently to a sheet conveying path C. Each sheet 25 is finally discharged onto the discharge tray 27 from the sheet conveying path C. However, whenever necessary, some sheets 25 are returned to the sheet conveying path B from the sheet conveying path C, via a sheet conveying path D, by the switchback mechanism 21B. The switchback mechanism 21B switchbacks the sheet 25 and thus reverses a sheet conveying direction thereof to bring the sheet 25 back to the access position P1 via the sheet conveying path D.

Along the sheet conveying path B, the IC reader-writer 18 and the image forming unit 17 are disposed. Specifically, the IC reader-writer 18 is located upstream, and the image forming unit 17 is located downstream of the sheet conveying path B. In the sheet conveying path B, a portion opposing the IC reader-writer 18 will be referred to as an 'access position P1' at which the IC reader-writer 18 can access the RFID tags, while a portion opposing to the image forming unit 17 will be referred to as an 'image forming position P2' at which the image forming unit 17 can form images on the sheets 25.

As above described, the sheet conveying path A and B serve to convey the sheet 25 to the access position P1 and the image forming position P2, while the sheet conveying path D serves to bring the sheet 25 back to the access position P1 for the re-access operation.

Next, a print routine executed by the CPU 11 will be described with reference to a flowchart of FIGS. 3 and 4.

Figure 3:
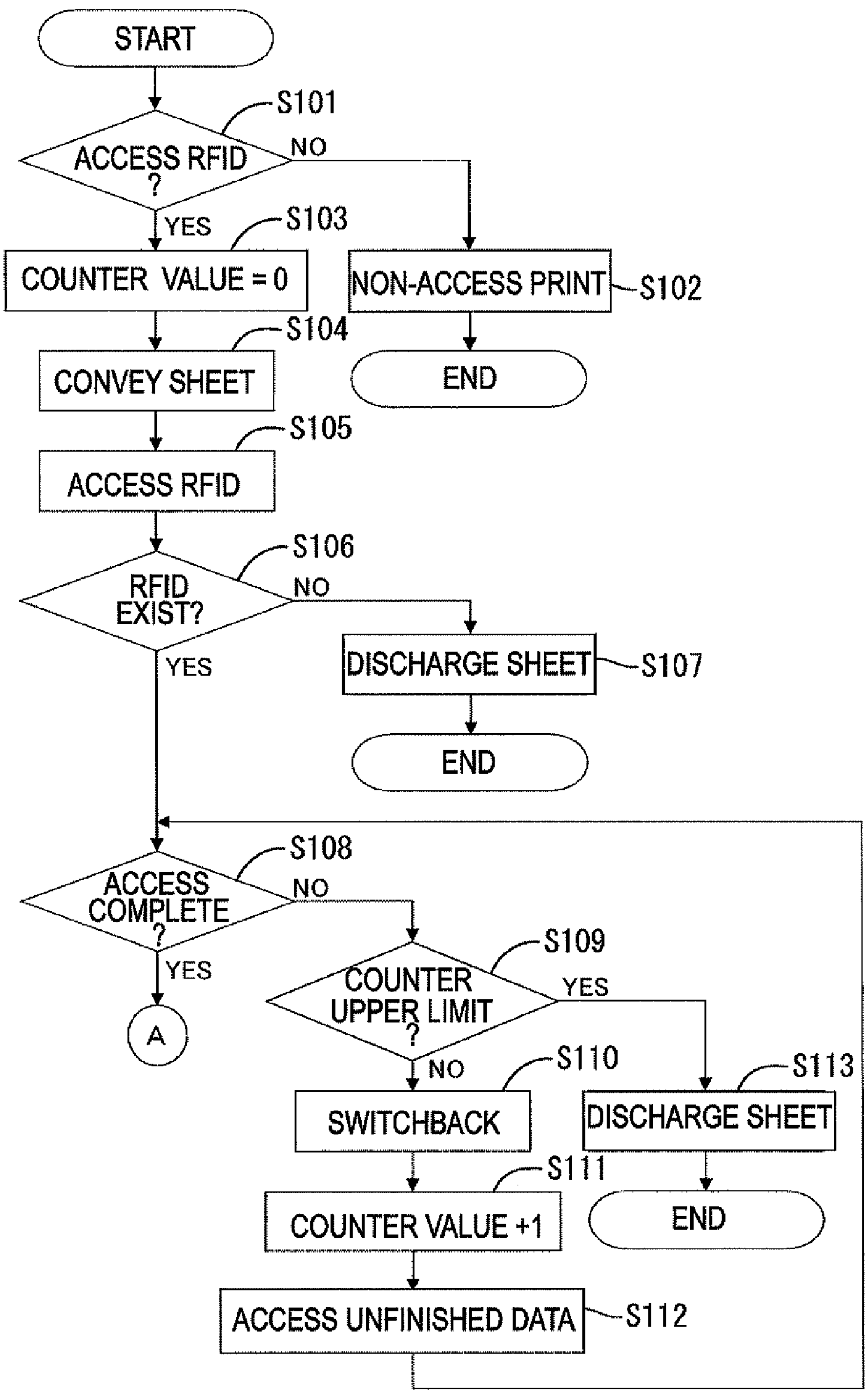
FIGS. 3 and 4 are a flowchart explaining flows of a print routine executed at the printer according to the first embodiment.
Figure 4:
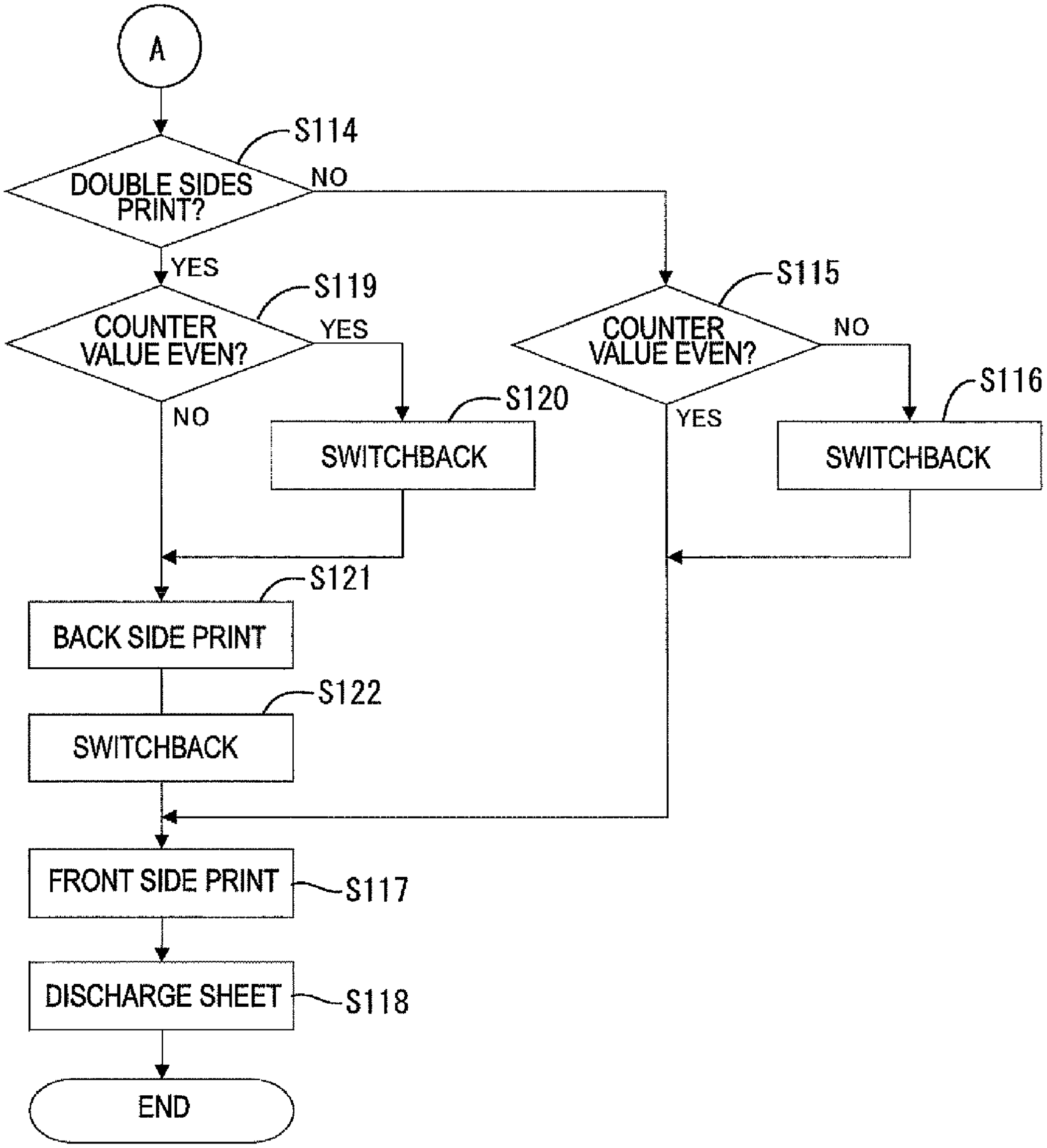

Upon receipt of a command requesting to execute printing via the network interface 15 from an external computer, the CPU 11 initiates the print routine shown in FIGS. 3 and 4.

Note that, when transmitting such a print command from an external computer, a user may specify various print conditions (such as double-sided or single-side; in color or in monochrome), instructions relating to accessing the RFID tags (such as instructions to read or write data), and instructions on contents to be written. All these instructions will be collectively referred to as an 'access instruction.' The print command includes such information on the print conditions and the access instructions. Alternatively, the user may input the print command and various settings from the operation unit 20. In this case, the print routine is configured to be executed based on the user's inputs.

As shown in FIG. 3, upon starting the print routine, the CPU 11 first determines whether there is an access instruction to an RFID tag (S101). If an access to the RFID tag is not instructed (S101:No), the CPU 11 executes printing without accessing the RFID tag (S102), and subsequently terminates the print routine.

On the other hand, if an access to the RFID tag is requested (S101:Yes), the CPU 11 sets a value of a counter to zero, the counter being for counting numbers of times the sheet 25 is re-conveyed (i.e., how many times the sheet 25 is flipped) (S103). The CPU 11 then instructs the conveyor unit 21 to start conveying the sheet 25 accommodated in the sheet accommodation tray 26 (S104). The CPU 11 then executes an access operation against the RFID tag attached to the sheet 25 while the sheet 25 passes the access position P1 (S105). Access operations executed here by the CPU 11 include: reading data such as authentication information stored in the RFID tags; and writing data such as a user name, printed time, print conditions and setting information. Additionally, image data to be printed may be written into the RFID tags.

The CPU 11 then determines whether the RFID tag is attached to the sheet 25 to which the CPU 11 executed the access operations (S106). If the RFID tag is determined not to be attached, i.e., if there is no reply from the RFID tag (S106: No), the CPU 11 instructs the conveyor unit 21 to convey the sheet 25 from the sheet conveying path B to the sheet conveying path C. The conveyor unit 21 then discharges the sheet 25 onto the discharge tray 27 without forming images thereon (S107). The print routine is then terminated.

As a variation, the IC reader-writer 18 may be configured to transmit a signal to detect existence of RFID tag before starting an access operation. In this case, if there is no response from the RFID tag, i.e., if the RFID tag is not detected, the CPU 11 may cancel executing the access operation.

If the RFID tag is determined to be attached (S106:Yes), the CPU 11 then determines whether access operations have completed successfully (S108). In other words, the CPU 11 determines whether all the data to be read have actually been read or all the data to be written have actually been written.

More specifically, for example, the CPU 11 may be configured to read data for a plurality of times and then to check consistency among the read data during one access operation. If any inconsistency exists among the read data or any portion of the data is left unread, the CPU 11 designates such data as being 'unprocessed,' determining that the access operation to the data has not successfully ended.

Alternatively, data to be written into the RFID tag is divided into a plurality of blocks and is written thereinto on a block-by-block basis. In order to determine that the access operation (writing operation in this case) has been successfully completed, each block data written into the RFID tag is retrieved therefrom and the resultant block data is compared with the corresponding original data block. This comparison is performed with respect to all the blocks of data during one access operation. If there is an inconsistency between the retrieved block data and the corresponding original block data or if writing or retrieving any block data has not finished during one access operation, such block data is treated as being 'unprocessed' and determination is made so that the access operation has not successfully ended. If this is the case, retry is implemented as will be described later.

As a further alternative, an amount of total data to be read may be recorded at a header portion of each RFID tag. In this case, the CPU 11 may determine that an access operation to the data has not yet been ended if an amount of data read by the IC reader-writer 18 does not cover the amount of the total data.

Returning to the flowchart of FIG. 3, when an access operation is determined not to have ended (S108:No), the CPU 11 then determines whether the value of the counter reaches a predetermined maximum value (upper limit) (S109). The maximum value is set to be greater than two (2) in the present embodiment. If the value of the counter does not reach the maximum value (S109:No), the CPU 11 instructs the switchback mechanism 21B to switchback the sheet 25 and to reconvey the sheet 25 to the access position P1 from the sheet conveying path C via the sheet conveying path D (S110). The CPU 11 then increments the value of the counter by one (S111).

Subsequently, the CPU 11 executes another access operation to the 'unprocessed' data when the RFID tag of the sheet 25 comes back to the access position P1 (S112). The flows S110-S112 executed by the CPU 11 are called as a 're-access operation.'

More precisely, in the re-access operation, the CPU 11 may instruct the RFID tag to transmit the 'unprocessed' data which have not yet been read in the previously-executed access operation. Upon receipt of the unprocessed data from the RFID tag, the CPU 11 adds the received data to data which have already been read and stored in the RAM 13 as a result of the previous access operation. Alternatively, the CPU 11 may instruct the IC reader-writer 18 to transmit 'unprocessed' data which have not yet been written in the previous access operation to the RFID tag. Upon receipt of the unwritten data, the RFID tag may add the same to data which have already been written and thus stored therein in the previous access operation.

In this way, the CPU 11 is configured not to repeat an access operation to data that have been successfully read or written in a preceding access operation. With this configuration, compared to a case where all the data are repeatedly accessed to each time, amounts of data to be re-accessed can be reduced, thereby leading to an increase in a probability of successfully completing an access operation to the data at the time of re-accessing. This configuration is especially effective when most of the data have been successfully read or written in an access operation executed for the first time.

Further, this configuration can realize at a higher probability that an access operation to the RFID tag ends successfully, not only if an amount of data to be accessed is large for one access operation, but also if communications between the IC reader-writer 18 and the RFID tag has failed because of some noise.

Once finishing the re-access operation at S110-S112, the CPU 11 then returns to S108 and again determines whether the access operation has been properly completed. If the access operation is determined not to have been completed yet (S108:No), the re-access operation is configured to be repeated until the value of the counter reaches the upper limit thereof (S109-S112). When the counter value reaches the upper limit (S109:Yes), the CPU 11 instructs the conveyor unit 21 to discharge the sheet 25 subject to the re-access operation (S113) and terminates the print routine.

In other words, when the upper limit is set to be greater than or equal to 2, the re-access operation is configured to be repeated for a plurality of times unless the access operation has completed successfully.

Now referring to FIG. 4, when the access operation ends successfully (S108:Yes), the CPU 11 determines whether a double-sided printing is instructed in the print command as a print condition (S114). If a single-side printing is designated (S114:No), the CPU 11 then determines whether the value of the counter is an even number (S115). If the counter value is an odd number (S115:No), the CPU 11 instructs the switchback mechanism 21B to bring the sheet 25 back to the access position P1 (S116). The CPU 11 subsequently instructs the image forming unit 17 to form an image for front surface on a side (which will be a front side) of the sheet 25 when the sheet comes to the image forming position P2 (S117). On the other hand, if the counter value is an even number (S115:Yes), the CPU 11 instructs the image forming unit 17 to form the front surface image on the front side of the sheet 25 without re-conveying the sheet 25, when the sheet 25 arrives at the image forming position P2 (S117).

With this configuration, regardless of the value of the counter being an even or odd number, a front surface image can be formed on a front side of each sheet 25. Note that the front surface image is configured to be formed on the side (i.e., the front side) of the sheet 25 that faces downward in the sheet accommodation tray 26.

The CPU 11 then discharges the sheet 25 having the image formed on the front side thereof out of the printer 1 via the sheet conveying path C (S118) and terminates the print routine. In this way, each of the discharged sheets 25 is stacked in the discharge fray 27 with the printed surface facing downward (in a face-down state). Even if the single-side printing is to be executed on a plurality of sheets 25, front surface images are formed on the side (front side) of each sheet 25 facing downward in the sheet accommodation tray 26 and each of the printed sheets 25 is discharged onto the discharge tray 27 in the face-down state.

If the double-sided printing is instructed in the print command (S114:Yes), the CPU 11 determines whether the value of the counter is an even number (S119). If the counter value is an even number (S119:Yes), the CPU 11 re-conveys the sheet 25 to the access position P1 using the switchback mechanism 21B (S120) and then instructs the image forming unit 17 to form an image for back surface on a side of the sheet 25 currently facing upward when the sheet 25 reaches the image forming position P2 (S121) If the counter value is an odd number (S119:No), the CPU 11 instructs the image forming unit 17 to form the back surface image on the currently upward surface of the sheet 25, without re-conveying the sheet 25, when the sheet 25 arrives at the image forming position P2 (S121). The CPU 11 then re-conveys the sheet 25 (S122), forms the image for front surface on another side of the sheet 25 facing currently upward when the sheet 25 reaches the image forming position P2 (117), and discharges the sheet 25 in a state where images have been formed on both sides of the sheet 25 (S118). The print routine is subsequently terminated.

With this configuration, no matter how many times the sheet 25 is reversed, the back surface image is formed on the surface of each sheet 25 facing upward in the sheet accommodation tray 26, while the front surface image on the other surface of each sheet 25 facing downward in the sheet accommodation tray 26. Even if the double-sided printing is to be executed on a plurality of sheets 25, this configuration holds true: the front surface images are formed on each front surface of the sheets 25 facing downward in the sheet accommodation tray 26, while the back surface images are formed on the other surface (back surface) of the sheets 25 facing upward in the sheet accommodation tray 26. Each sheet 25 is finally discharged onto the discharge tray 27 with the front surface facing downward.

As a variation, if both sides of the sheet 25 need not to be distinguished, the steps where the sheet 25 is re-conveyed in accordance with the number of times the sheet 25 is reversed (S115, S116, S119, S120) may be omitted in the print routine.

Note that, in a conventional image forming device not configured to execute re-access operations, a speed at which each sheet is conveyed may be slowed down to make time for accessing an RFID tag in order to complete each access operation at a time. However, with the above-described configuration of the present embodiment in which a re-access operation is carried out only to 'unprocessed' data, each access operation is not necessarily to be completed at one time and therefore the speed needs not to be slowed down. Accordingly, a printing operation can end in a short time in case that only one access operation is performed.

Further, in the present embodiment, re-access operations are to be repeated for a plurality of times unless the access operation to the sheet 25 is successfully completed. Hence, such a configuration also contributes to a success in the access operation at a higher rate.

Further, when the value of the counter reaches the upper limit thereof, i.e., if re-access operations to data are repeated for a plurality of times but accessing the data have not completed yet, the sheet 25 is configured to be discharged. In this way, even if the access operation to the data cannot end normally for some reason (due to a failure of an IC chip, for example), endlessly repeating the re-access operations to the same data can be prevented.

Further, if the RFID tag is not attached to the sheet 25, the sheet 25 is to be discharged without re-access operations thereto being executed. With this configuration, unnecessary re-access operations can be prevented from being executed to sheets having no RFID tags.

Moreover, an image is formed on the sheet 25 only if the access operation to the sheet 25 ends successfully. In other words, if image forming has been done on the sheet 25 but the access operation thereto has failed, colorants used for the image forming and the sheet 25 itself may become nothing but a waste. However, in the present embodiment, an image is to be formed on the sheet 25 after the access operation to the sheet 25 has been successfully completed, thereby reliably avoiding producing such a waste.

When images are formed on a plurality of sheets 25, each sheet 25 is discharged in a state where the values of the counter for each sheet 25 can all be even or odd numbers. With this configuration, regardless of the numbers of times each sheet 25 is reversed, each sheet 25 is always discharged in the face-down state, i.e., the front surface downward and the back surface upward in the discharge tray 27. Note that the sheets 25 may be discharged in a face-up state, instead of the face-down state. In any case, a user does not need to manually flip sides of each sheet 25 to organize the discharged sheets 25.

Further, when an image needs to be formed on a front surface of each sheet 25, the numbers of times each sheet 25 has been flipped are all set to be even or odd numbers. Hence, regardless of the values of the counter being even or odd numbers, a front surface image is reliably formed on the front side of each sheet 25.

Figure 5:
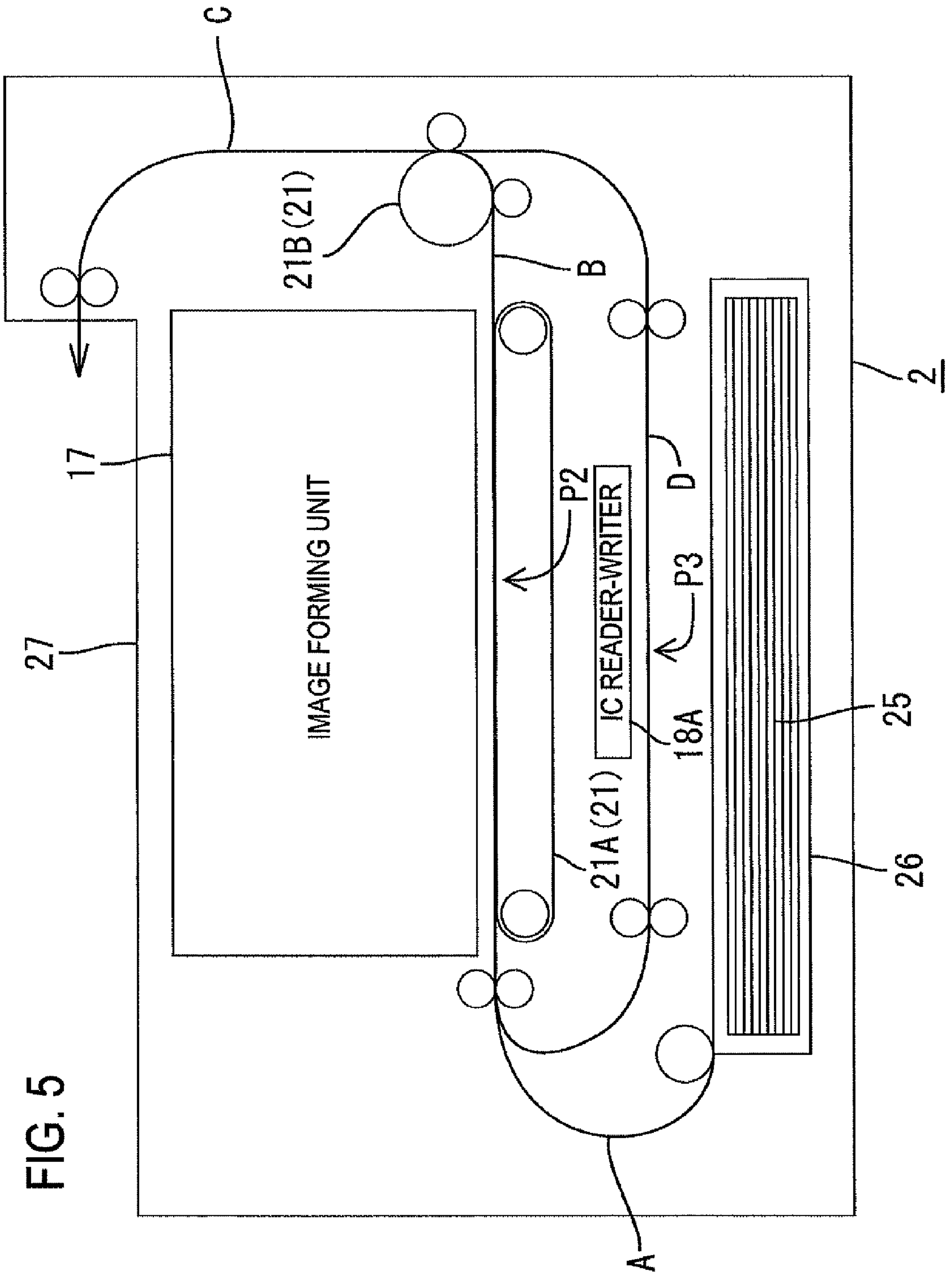
FIG. 5 is a cross-sectional view illustrating a general configuration of a printer as an example of an image forming device according to a second embodiment of the present invention.

Next, a second embodiment of the present invention will be described with reference to FIGS. 5 and 6. Note that in the following description, like parts and components are designated by reference numerals the same as the first embodiment to avoid duplicating description.

First, a general configuration of a printer 2 according to the second embodiment is described with reference to FIG. 5. The printer 2 is different from the printer 1 in that the printer 2 includes an IC reader-writer 18A facing the sheet conveying path D. The IC reader-writer 18A has a flat shape in a vertical direction and is interposed between the sheet accommodation tray 26 and the belt unit 21A. In the printer 2, therefore, an access position P3 where the IC reader-writer 18A can access the RFID tags of the sheets 25 is located along the sheet conveying path D at a position opposing the IC reader-writer 18A.

Figure 6:
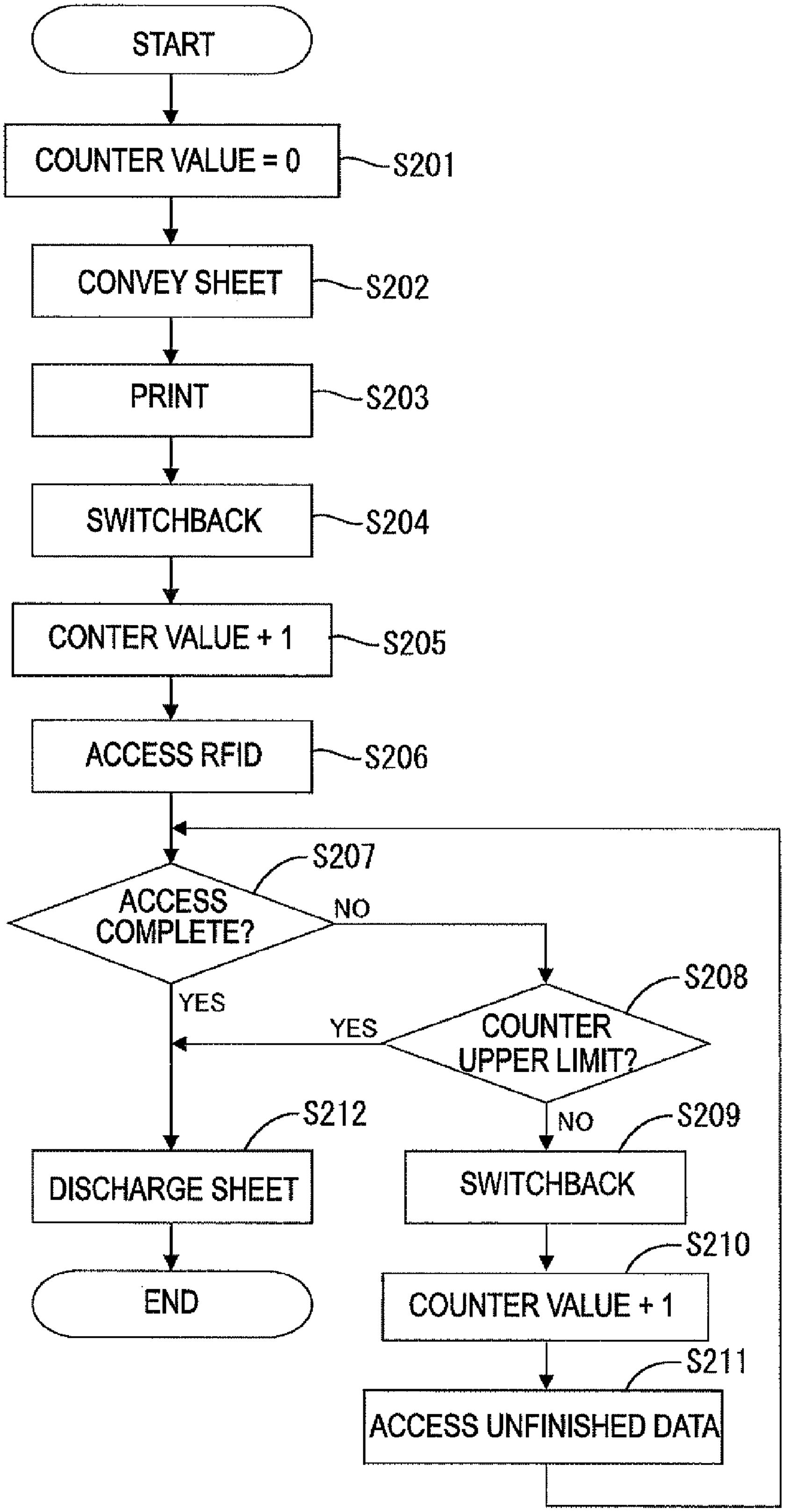
FIG. 6 is a flowchart explaining flows of a print routine executed at the printer according to the second embodiment.

Referring to FIG. 6, a routine for executing a single-side printing at the printer 2 will be described next.

Upon a print operation being initiated, the CPU 11 first sets the value of the counter to zero (S201) and then starts conveying the sheet 25 from the sheet accommodation tray 26 (S202). When the sheet 25 comes to the image forming position P2, the CPU 11 instructs the image forming unit 17 to form an image on the sheet 25 (S203). Subsequently, the CPU 11 re-conveys the sheet 25 (S204), increments the value of the counter by one (S205) and instructs the IC reader-writer 18A to access the RFID tag of the sheet 25 (S206).

The CPU 11 then determines whether the access operation has been successfully completed (S207). As long as the access operation has not yet finished (S207:No) and the counter value does not reach the upper limit thereof (S208:No), the CPU 11 continues to bring the sheet 25 back to the access position P3 (S209), adds one to the counter value (S210) and instructs the IC reader-writer 18A to try accessing the 'unprocessed' data again (S211). In this way, unless the access operation has finished successfully, the CPU 11 repeats S208-S211 until the counter value reaches the maximum number thereof. Once the access operation has successfully ended (S207:Yes), or if the value of the counter reaches the upper limit thereof (S208:Yes), the CPU 11 discharges the sheet 25 onto the sheet accommodation tray 26 and terminates the print routine.

In the second embodiment, the IC reader-writer 18A is disposed along the sheet conveying path D. Hence, compared to the first embodiment where the IC reader-writer 18 and the image forming unit 17 are disposed along the sheet conveying path B, the printer 2 can be made compact with respect to the front-to-rear direction (i.e., the sheet conveying direction). Therefore, the front-to-rear dimension of the printer 2 can be made shorter, while enabling the area of the access position P3 to be greater in the front-to-rear direction. As a result, the IC reader-writer 18A can have longer time to complete each access operation to the RFID tags, leading to an improved probability of successfully finishing access operations each time.

As a variation, instead of the single-side printing, a double-sided printing may be executed in the second embodiment.

While the invention has been described in detail with reference to the specific embodiments thereof, it would be apparent to those skilled in the art that various changes and modifications may be made therein without departing from the spirit of the invention.

For example, the present invention may be applied to image forming devices of various kinds, such as electrophotographic image forming devices, inkjet image forming devices, and image forming devices that print in black and white only. Further, the present invention is also applicable to an image forming device without a belt unit and to an image forming device provided with scanning and facsimile functions.

Further, in the access operation according to the present invention, the IC reader-writers 18 and 18A can read data stored in the RFID tags and write data into the RFID tags. However, the IC reader-writers 18 and 18A may also be configured to perform either reading or writing data only. Alternatively, a plurality of access positions may be provided in an image forming device. If this is the case, such an image forming device may be configured to read data at some access positions, while write data at other access positions.

What is claimed is:

1. An image forming device comprising:

a conveyor section configured to convey recording media in a conveying path, the recording media including a first recording medium having a data storage unit attached thereto and a second recording medium having no data storage unit attached thereto, the data storage unit storing data or being capable of storing data;

an image forming section that forms an image on the recording media;

an accessing section that is disposed at an access position along the conveying path and accesses the data storage unit of the first recording medium to execute an access operation to write data into or read data from the data storage unit;

a control section that is configured to control the conveyor section and the accessing section to bring the first recording medium having passed the access position back to the access position and to access the data storage unit attached to the first recording medium brought back to the access position to execute a re-access operation to write unprocessed data into or read unprocessed data from the data storage unit, the unprocessed data being such data that remained unprocessed with the access operation;

wherein the control section is further configured to control the image forming section to form the image on the first recording medium when the access operation has successfully completed, the first recording medium being flipped when the first recording medium is brought back to the access position for the re-access operation, the first recording medium having a first surface and a second surface, the control section being further configured to count how many times the first recording medium has been flipped; and wherein the image forming section forms a first-surface image on the first surface of the first recording medium when the first recording medium has been flipped for an even number of times.

2. The image forming device as claimed in claim 1, wherein the control section is configured to execute the re-access operation for at least once unless the access operation has successfully completed.

3. The image forming device as claimed in claim 2, wherein the re-access operation is repeatedly executed up to a predetermined number of times, and the control section is further configured to control the conveyor section to discharge the first recording medium out of the image forming device when the re-access operation has been repeated for the predetermined number of times.

4. The image forming device as claimed in claim 1, wherein the control section is further configured to control the conveyor section to discharge the recording medium without bringing back to the accessing section when the recording medium is determined to be the second recording medium having no data storage unit attached thereto.

5. The image forming device as claimed in claim 1, wherein, when the first recording medium has been flipped for an odd number of times, the first recording medium is flipped one more time before the image forming section forms the first-surface image on the first surface of the first recording medium.

6. The image forming device as claimed in claim 1, wherein the image forming section forms a second-surface image on the second surface of the first recording medium when the first recording medium has been flipped for an odd number of times.

7. The image forming device as claimed in claim 1, wherein the control section is further configured to control the conveyor section to discharge the recording media in a state where each first recording medium has been flipped for an even number of times.

8. The image forming device as claimed in claim 1, wherein the control section is further configured to control the conveyor section to discharge the recording media in a state where each first recording medium has been flipped for an odd number of times.

9. The image forming device as claimed in claim 1, wherein the data storage unit comprises an RFID.

10. The image forming device as claimed in claim 1, wherein the conveyor section comprises a first conveying portion that conveys the first recording medium in a first path of the conveying path along which the image forming section and the accessing section are disposed, and a second conveying portion that brings the first recording medium back to the accessing section after the first recording medium has passed the image forming section.

* * * * *